US012774719B2

(12) United States Patent
Hayashi et al.

(10) Patent No.: US 12,774,719 B2
(45) Date of Patent: Oct. 27, 2026

(54) ROLLING BEARING CAGE AND ROLLING BEARING

(71) Applicant: NTN CORPORATION, Osaka (JP)

(72) Inventors: Takumi Hayashi, Mie (JP); Yoshihiko Matsutani, Mie (JP); Masaki Nakanishi, Mie (JP)

(73) Assignee: NTN CORPORATION, Osaka (JP)

( * ) Notice: Subject to any disclaimer, the term of this patent is extended or adjusted under 35 U.S.C. 154(b) by 90 days.

(21) Appl. No.: 18/848,903

(22) PCT Filed: Mar. 20, 2023

(86) PCT No.: PCT/JP2023/010805
§ 371 (c)(1),
(2) Date: Sep. 19, 2024

(87) PCT Pub. No.: WO2023/182252
PCT Pub. Date: Sep. 28, 2023

(65) Prior Publication Data

US 2025/0207635 A1 Jun. 26, 2025

(30) Foreign Application Priority Data

Mar. 23, 2022 (JP) ................................ 2022-047005

(51) Int. Cl.
*F16C 33/44* (2006.01)
*F16C 19/16* (2006.01)

(52) U.S. Cl.
CPC .............. *F16C 33/44* (2013.01); *F16C 19/16* (2013.01); *F16C 2208/04* (2013.01); *F16C 2208/60* (2013.01); *F16C 2220/04* (2013.01)

(58) Field of Classification Search
CPC .... F16C 33/3856; F16C 33/416; F16C 33/44; F16C 33/4635
See application file for complete search history.

(56) References Cited

FOREIGN PATENT DOCUMENTS

| | | | | | |
|---|---|---|---|---|---|
| CN | 115126779 A | * | 9/2022 | | F16C 33/38 |
| JP | 2000-227120 A | | 8/2000 | | |
| JP | 2001-317554 A | | 11/2001 | | |
| JP | 2006-207684 A | | 8/2006 | | |
| JP | 2012163172 A | * | 8/2012 | | F16C 33/44 |

(Continued)

OTHER PUBLICATIONS

Translation of JP2021152394 obtained Feb. 12, 2026.*

(Continued)

*Primary Examiner* — James Pilkington
(74) *Attorney, Agent, or Firm* — Hedman & Costigan, P.C.; James V. Costigan; Kathleen A. Costigan

(57) ABSTRACT

To provide a rolling bearing cage that is superior in heat resistance and realizes superior moldability even in a case in which the cage has a thick wall, and a rolling bearing using the cage. A cage 5 is an annular rolling bearing cage formed by injection-molding a resin composition. The rolling bearing cage 5 includes rolling elements and a plurality of pockets 6 for retaining the rolling elements. A thickness in a radial direction of an axial end surface 5*a* of the cage 5 is 2.00 mm or more. The resin composition contains polyamide resin as a base resin. The polyamide resin is copolymerized polyamide containing a hexamethylene terephthalamide unit and a hexamethylene adipamide unit as a constitutional unit.

5 Claims, 10 Drawing Sheets

(56) References Cited

FOREIGN PATENT DOCUMENTS

| | | | | |
|---|---|---|---|---|
| JP | 2016-121735 | A | | 7/2016 |
| JP | 2020-111636 | A | | 7/2020 |
| JP | 2021-148250 | A | | 9/2021 |
| JP | 2021152394 | A | * | 9/2021 |

OTHER PUBLICATIONS

Machine translation of JP 2000-227120 A dated Aug. 15, 2000.
Machine translation of JP 2001-317554 A dated Nov. 16, 2001.
Machine translation of JP 2006-207684 A dated Aug. 10, 2006.
Machine translation of JP 2016-121735 A dated Jul. 7, 2016.
Machine translation of JP 2021-152394 A dated Sep. 30, 2021.
Machine translation of JP 2020-111636 A dated Jul. 27, 2020.
Machine translation of JP 2021-148250 A dated Sep. 27, 2021.

* cited by examiner

Example A (PA6T/66)

cage No. 7

Comparative example A (PA10T)

cage No. 7

Comparative example B (PA66)

cage No. 7

ROLLING BEARING CAGE AND ROLLING BEARING

TECHNICAL FIELD

The present invention relates to a rolling bearing cage and a rolling bearing using the cage.

BACKGROUND ART

A rolling bearing widely employs a resin cage as a cage that rollably retains a rolling element. The resin cage is superior in self-lubricating performance, low friction property and light weight compared to an iron cage. As a synthetic resin for the resin cage, aliphatic polyamide resin such as polyamide 6 (PA6) resin, polyamide 66 (PA66) resin and polyamide 46 (PA46) resin is generally employed. Further, a fiber reinforcing material such as glass fiber is compounded to the synthetic resin as needed to reinforce the synthetic resin (see Patent Document 1).

In recent years, it is required to cope with high speed driving of the bearing as a use of mainly EV (electric vehicles), and thus high heat resistance is also required to the resin cage. Thus, instead of the aliphatic polyamide resin that is generally employed, a cage that employs aromatic polyamide resin that is superior in heat resistance has been increased. For example, polyamide 9T (PA9T) and polyamide 10T (PA10T) are high in glass transition point and melting point compared to the aliphatic polyamide resin, and thus the cage that employs such resin has been proposed (see Patent Documents 2, 3 and 4).

PRIOR ART DOCUMENTS

Patent Documents

Patent Document 1: JP 2000-227120 A
Patent Document 2: JP 2001-317554 A
Patent Document 3: JP 2006-207684 A
Patent Document 4: JP 2016-121735 A

SUMMARY OF THE INVENTION

Problems to be Solved by the Invention

In a case in which a rolling bearing with a resin cage assembled therein is rotated at a high speed, the centrifugal force caused by a high speed rotation is applied to the cage, which might deform the cage. The deformation of the cage increases the friction between the cage and the rolling element retained by the cage, and thus heat generation of the bearing might be caused. Also, the deformation of the cage causes the contact with an outer ring of the bearing. Accordingly, the resin might melt due to the frictional heat caused by the contact, which prevents the bearing from rotating. Thus, the resin cage that is assembled in the rolling bearing used at a high rotation speed is required not to be deformed by the mechanical and/or thermal stress.

Against this, the aromatic polyamide resin has high melting point and high glass transition temperature, which means superior material against high temperature. Accordingly, the aromatic polyamide resin is suitable to be used in a high speed rotation condition. However, the aromatic polyamide resin is apt to be inferior in moldability due to its high melting point and viscosity, compared to the aliphatic polyamide resin. Specifically, the aromatic polyamide resin might cause an internal defect (crack or void) easily, compared to the aliphatic polyamide resin, due to the high melt viscosity in the injection molding or an influence of the volume contraction behavior in solidifying that is different behavior from the aliphatic polyamide resin. In particular, in a cage of complex shape having a thick wall, the volume contraction behavior becomes different between an inside and an outside, which might cause the internal defect.

An object of the present invention is, in order to solve such a problem, to provide a rolling bearing cage that has superior heat resistance and realizes superior moldability even in a case in which the cage has a thick wall, and to provide a rolling bearing using the cage.

Means for Solving the Problems

A rolling bearing cage of the present invention is an annular rolling bearing cage formed by injection-molding a resin composition. The rolling bearing cage includes rolling elements and a plurality of pockets for retaining the rolling elements. A thickness in a radial direction of an axial end surface of the cage is 2.00 mm or more. The resin composition contains polyamide resin as a base resin. The polyamide resin is copolymerized polyamide containing a hexamethylene terephthalamide unit and a hexamethylene adipamide unit as a constitutional unit.

In the present invention, the manner of "the thickness in the radial direction of the axial end surface of the cage (also simply referred to as the thickness in the radial direction)" is a half of a difference between an inner diameter and an outer diameter of the axial end surface of the cage. In a case in which there are several values, the maximum value is defined as the thickness in the radial direction.

The thickness in the radial direction of the axial end surface of the cage may be 3.00 mm or more.

In a plane developed view of an outer diametrical surface of the cage, a diameter of an inscribed circle of a region surrounded by the pockets adjacent to each other and the axial end surface may be 5.00 mm or more.

The polyamide resin may have a glass transition temperature of 80-110° C. and a melting point of 300° C. or more.

The resin composition may contain 10-50 wt % of glass fiber or carbon fiber relative to a whole of the resin composition.

In a plane developed view of an outer diametrical surface of the cage, a diameter of an inscribed circle of a region surrounded by the pockets adjacent to each other and the axial end surface may be 3.00-10.00 mm. A ratio (axial length/thickness in radial direction) of the axial length of the cage to the thickness in the radial direction of the axial end surface of the cage may be 3.00-6.00. The polyamide resin may have a glass transition temperature of 80-110° C. and a melting point of 300° C. or more.

A rolling bearing of the present invention includes an inner ring, an outer ring, a plurality of rolling elements intervened between the inner ring and the outer ring, and a cage which retains the rolling elements. The cage is the rolling bearing cage of the present invention.

The rolling bearing may be used in a rotation range in which a dm·n value is $80\text{-}300\times10^4$.

Effect of the Invention

The rolling bearing cage of the present invention has the thickness in the radial direction of 2.00 mm or more (in particular, 3.00 mm or more), which is relatively thick, and thus an internal defect might be caused in the injection molding. However, in the rolling bearing cage of the present invention, the polyamide resin that is a base resin employs the copolymerized polyamide containing a hexamethylene terephthalamide unit and a hexamethylene adipamide unit as a constitutional unit, so that both superior heat resistance of the aromatic polyamide resin and superior moldability of the aliphatic polyamide resin can be realized. Thus, the rolling bearing cage has superior heat resistance and suppresses the generation of the internal defect. Accordingly, superior moldability can be realized.

Even in a case in which the diameter of the inscribed circle of the region surrounded by the pockets adjacent to each other and the axial end surface is 5.00 mm or more in the plane developed view of the outer diametrical surface of the cage, the generation of the internal defect can be favorably suppressed by employing the above-described polyamide resin.

The above-described polyamide resin has the melting point of 300° C. or more, and thus the above-described polyamide resin has superior heat resistance compared to PA66 (melting point of approximately 260° C.) and PA46 (melting point of approximately 295° C.) that are generally used as a cage material. Further, the above-described polyamide resin has the heat resistance equivalent to PA9T (melting point of approximately 305° C.) and PA10T (melting point of approximately 315° C.). Thus, the deformation of the cage can be made small in, for example, a high temperature condition or a high speed rotation condition. Further, the above-described polyamide resin has the glass transition temperature of 80-110° C., and thus the cage can be suppressed from deforming when used in, for example, the high speed rotation condition. Accordingly, the heat generation due to sliding friction between the rolling elements and the cage can be decreased.

The resin composition contains 10-50 wt % of the glass fiber or the carbon fiber relative to the whole of the resin composition. Thus, the rigidity of the cage can be enhanced, and the deformation of the cage can be made small in, for example, a high speed rotation condition.

The rolling bearing of the present invention includes the inner ring, the outer ring, a plurality of the rolling elements intervened between the inner ring and the outer ring, and the cage of the present invention which retains the rolling elements. Thus, the cage can be suppressed from deforming when used in a rotation range in which the dm·n value is $80\text{-}300\times10^4$. Accordingly, the bearing having superior durability can be realized.

MODE FOR CARRYING OUT THE INVENTION

Figure 1:
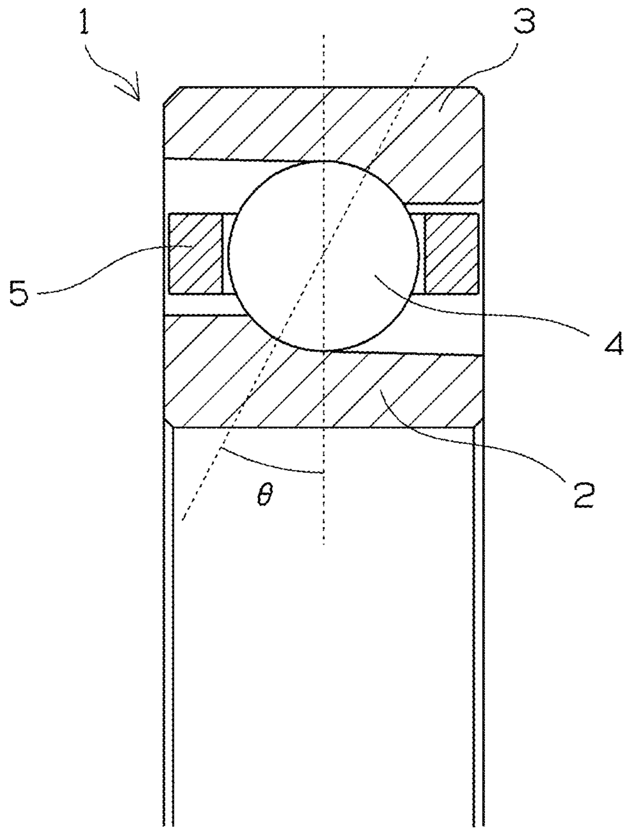
FIG. 1 is an axial sectional view showing an example of a rolling bearing according to the present invention.

A rolling bearing cage of the present invention is a resin cage formed by injection-molding a resin composition. The cage is an annular member having a plurality of pockets for retaining rolling elements. The resin composition as a resin material contains a specified polyamide resin as a main component, and a specified amount of a fiber reinforcing material (glass fiber or carbon fiber) is compounded thereto as needed.

In the present invention, the polyamide resin of the cage employs copolymerized polyamide containing a hexamethylene terephthalamide unit and a hexamethylene adipamide unit as a constitutional unit. The hexamethylene terephthalamide unit is a constitutional unit of PA6T, in which terephthalic acid that is dicarboxylic acid and 1,6-hexanediamine that is diamine are polymerized. The hexamethylene adipamide unit is a constitutional unit of PA66, in which adipic acid that is dicarboxylic acid and 1,6-hexanediamine that is diamine are polymerized.

An internal defect such as crack and void in an injection-molded resin component is caused by a difference of contraction behaviors between inside and outside caused by a temperature difference between the inside and the outside in a cooling and solidifying process. For example, PA9T or PA10T, which is the aromatic polyamide resin, easily causes the difference of the contraction behaviors between the inside and the outside because the contraction behavior at high pressure is largely different from the contraction behavior at low pressure in a PVT curve that represents a volume contraction behavior in the cooling and solidifying process of the resin. However, the difference of the contraction behaviors between the inside and the outside is small in the aliphatic polyamide resin because of less pressure dependence on the contraction behavior. In the polyamide resin employed in the present invention, the heat resistance is secured by the PA6T that is the aromatic polyamide resin, and the internal defect or the deformation is hardly caused because the difference of the contraction behaviors between the inside and the outside is small due to the PA66 that is the aliphatic polyamide resin compared to the resin material of the aromatic polyamide resin.

The polyamide resin employed in the present invention may employ, for example, a binary copolymerized polyamide substantially consisting of a PA6T unit and a PA66 unit.

The polyamide resin may contain other monomer units, for example, a ternary copolymerized polyamide containing three kinds of monomer units including the PA6T unit and the PA66 unit, or a quaternary copolymerized polyamide containing four kinds of monomer units including the PA6T unit and the PA66 unit.

Examples of a dicarboxylic acid component employed in other monomer unit include aliphatic dicarboxylic acid such as oxalic acid, malonic acid, succinic acid, glutaric acid, adipic acid, pimelic acid, suberic acid, azelaic acid, sebacic acid, undecanedioic acid and dodecanedioic acid, alicyclic dicarboxylic acid such as cyclohexanedicarboxylic acid, and aromatic dicarboxylic acid such as phthalic acid, isophthalic acid, terephthalic acid and naphthalenedicarboxylic acid. Further, examples of the diamine component employed in other monomer unit include aliphatic diamine such as 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine and 1,12-dodecanediamine, alicyclic diamine such as cyclohexanediamine, and aromatic diamine such as xylylenediamine. Further, lactam such as caprolactam may be copolymerized with the polyamide resin.

Examples of the ternary copolymerized polyamide include copolymerized polyamide (PA4T/6T/66) of the PA6T unit, the PA66 unit and a tetramethylene terephthalamide unit (a constitutional unit of PA4T), and copolymerized polyamide (PA6T/6I/66) of the PA6T unit, the PA66 unit and the hexamethylene isophthalamide unit (a constitutional unit of PA6I).

The melting point of the polyamide resin preferably 300° C. or more, more preferably 300-330° C., and further more preferably 300-320° C. The polyamide resin has high melting point and superior heat resistance compared to the PA66 resin and PA46 resin that are generally employed as a cage material, and thus the cage can be prevented from deforming even when the cage is used at high temperature and high rotation speed such as dm·n value of $80\times10^4$ or more. Further, the melting point can be measured by using a differential scanning calorimeter (DSC) as an endothermic peak temperature (Tm) that appears when the polyamide resin is heated at a temperature increasing rate of 20° C./minute after the polyamide resin is cooled from a molten state toward a temperature of 25° C. at a temperature decreasing rate of 20° C./minute in an inert gas atmosphere.

The glass transition temperature of the polyamide resin is preferably 80-110° C., more preferably 90-110° C. The polyamide resin has the glass transition temperature higher than PA66 resin (glass transition temperature of approximately 60° C.) and PA46 resin (glass transition temperature of approximately 78° C.) that are generally employed as the cage material, and thus the cage can be prevented from deforming even when the cage is used, for example, at high rotation speed, and heat generation due to sliding friction between the rolling element and the cage can be made small. Further, the glass transition temperature can be measured by using the differential scanning calorimeter (DSC) as an intermediate temperature (Tg) of a stepped endothermic peak temperature that appears when the polyamide resin is heated at a temperature increasing rate of 20° C./minute after the polyamide resin is quickly cooled in an inert gas atmosphere (JIS K7121).

A method for producing the polyamide resin employed in the present invention may employ various polymerizations such as a melt polymerization, a solid-state polymerization, a bulk polymerization, a solution polymerization, and a combination thereof.

A compound rate of the polyamide resin is preferably 50 wt % or more, more preferably 60-90 wt %, relative to the whole of the resin composition. The resin composition may be formed of only the polyamide resin (100 wt % resin).

A fiber reinforcing material may be compound into the polyamide resin. Examples of the fiber reinforcing material include glass fiber and carbon fiber. A compound rate of the fiber reinforcing material is not especially limited, but may be, for example, 10-50 wt % relative to the whole of the resin composition. With the fiber reinforcing material within the above-described range, molding flowability can be secured and rigidity of the cage can be enhanced. Thus, for example, even when the cage is used at a high rotation speed, the cage is suppressed from deforming. Further, considering a shape of the cage forcibly extracted in the injection-molding or the sufficient strength (tensile strength) of a weld portion, the compound rate of the fiber reinforcing material may be 20-40 wt % relative to the whole of the resin composition.

An additive other than the fiber reinforcing material may be compounded as needed into the resin composition of the present invention to such an extent that does not deteriorate the function of the cage and the injection molding performance. Examples of other additive include a solid lubricant, an inorganic filling material, an antioxidant, an antistatic agent, and a mold release agent.

After the materials that form the resin composition are mixed as needed using a Henschel mixer, a ball mixer, a ribbon blender or the like, the materials are melt-kneaded by a melt extruder such as a twin-screw melt extruder to obtain molding pellets. Further, in the melt-kneading by a twin-screw melt extruder or the like, a side feed may be employed for charging the filling material. The cage is formed by the injection molding using the molding pellets. During the injection molding, the resin temperature is set to be higher than the melting point of the polyamide resin, and a temperature of the mold is set to be higher than the glass transition temperature of the polyamide resin.

Figure 2:
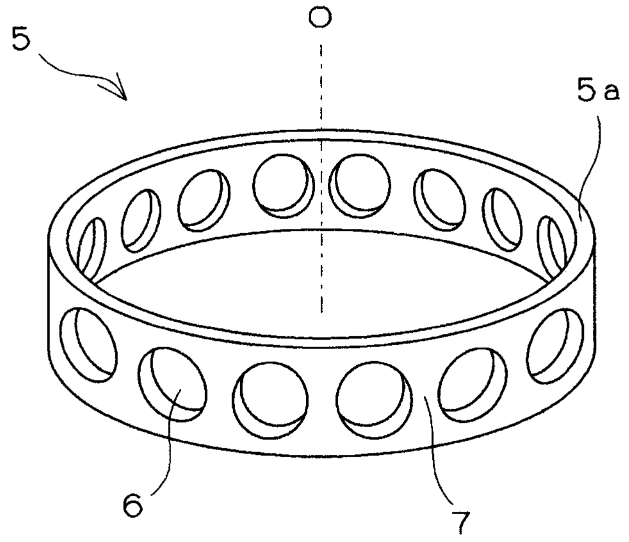
FIG. 2 is a perspective view showing an example of a rolling bearing cage according to the present invention.

The rolling bearing cage and the rolling bearing according to the present invention are described with reference to FIGS. 1 and 2. FIG. 1 is an axial sectional view of an angular ball bearing as one example of the rolling bearing according to the present invention. FIG. 2 is a perspective view of the cage (machined cage) in the rolling bearing shown in FIG. 1.

As shown in FIG. 1, an angular ball bearing 1 includes an inner ring 2, an outer ring 3, a plurality of balls (rolling elements) 4 intervened between the inner ring 2 and the outer ring 3, and a cage 5 which retains the balls 4 in a circumferential direction at regular intervals. The cage 5 corresponds to the rolling bearing cage according to the present invention. The inner ring 2 and the outer ring 3 come into contact with the ball 4 at a specified angle θ (contact angle) relative to a center line in a radial direction so as to receive a radial load and an axial load in one direction. In the example shown in FIG. 1, the cage 5 is an outer ring guide type and has an outer ring guide portion, which is guided by the outer ring 3, on a portion of an outer peripheral surface of the cage. The guide type of the cage is not limited to the outer ring guide type, and an inner ring guide type may be also employed. Further, a lubricant such as grease is sealed as needed around the balls 4 to lubricate the balls 4.

The rolling bearing of the present invention is especially suitable to be used in a high temperature condition or a high speed rotation condition. The rolling bearing is used in a rotation range in which, for example, the dm·n value is $80\text{-}300\times10^4$. The dm·n value may be $150\times10^4$ or more, or $200\times10^4$ or more.

In the example shown in FIG. 1, the angular ball bearing 1 employs an injection-molded body of the resin composition as the cage 5. The resin composition contains the polyamide resin having high melting point and superior moldability, as a base resin. Accordingly, the angular ball bearing 1 can prevent the cage from deforming in a high speed rotation condition. In particular, as described in the following Example, the generation of the internal defect is suppressed even in a cage having a thick wall. Thus, the break of the cage when the high speed rotation is applied thereto is suppressed, and the fatigue property thereof becomes superior. Further, the above-described polyamide resin has superior self-lubricating performance and low friction performance, and thus the heat generation caused by the friction between the ball 4 or the outer ring 3 and the cage 5 can be made small, which suppresses the temperature increasing. Thus, the bearing can be used for a long time even in a high speed rotation condition.

As shown in FIG. 2, the cage 5 is formed as a machined cage and has a plurality of pockets 6, which retains the balls, disposed in an annular cage body in the circumferential direction at regular intervals. A column portion 7 is disposed between the pockets 6 adjacent to each other in the circumferential direction. The cage 5 may be formed by injection-molding the above-described resin composition while forming the pockets in the injection molding step using a mold having a slide core, or may be formed by machining a fabricated material to form the pockets after the fabricated material is molded.

In the cage 5, a direction that is in parallel to the center axis O is defined as an axial direction, a direction that is orthogonal to the center axis O in a plane view seen in the axial direction is defined as a radial direction, and a direction around the center axis O in the plane view is defined as the circumferential direction.

In the example shown in FIG. 2, an axial end surface 5*a* of the cage 5 is formed by an annular flat plane having a certain thickness (a uniform thickness in FIG. 2) in the radial direction of the cage 5. The present invention employs the cage having the thickness in the radial direction of 2.00 mm or more. The thickness in the radial direction of the cage 5 may be 3.00 mm or more, or 5.00 mm or more. In a case in which the thickness in the radial direction is large, the internal defect might be caused easily in the aromatic polyamide resin such as PA9T and PA10T. Accordingly, the cage of the present invention is especially suitable to the cage having a thick wall. The thickness in the radial direction of the cage 5 may be, for example, 20.00 mm or less, or 15.00 mm or less.

Figure 3:
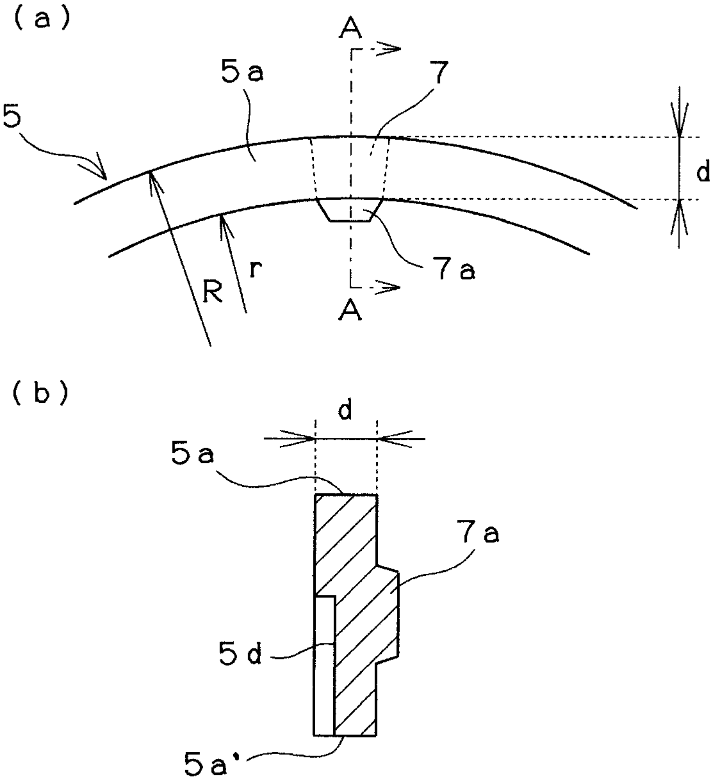
FIGS. 3(*a*) and 3(*b*) are explanatory views for a thickness in a radial direction of the cage.

The thickness in the radial direction of the cage is further described with reference to FIGS. 3(*a*) and 3(*b*). FIG. 3(*a*) is a partial plane view of the axial end surface of the cage, and FIG. 3(*b*) is a sectional view taken along line A-A in FIG. 3(*a*). The thickness d in the radial direction on the axial end surface 5*a* of the cage 5 is a half of a difference between an inner diameter r and an outer diameter R of the axial end surface 5*a* at any position in the circumferential direction. The inner diameter and the outer diameter of the axial end surface of the cage may be measured using a ruler or a caliper. The cage 5 shown in FIGS. 3(*a*) and 3(*b*) has a rib 7*a* at an inner diametrical side of the column portion 7, however the rib 7*a* is not formed on the axial end surface 5*a*, and thus the thickness d in the radial direction of the cage 5 does not include the thickness of the rib 7*a*.

The thickness d in the radial direction might not be uniform depending on the shape of the axial end surface of the cage. For example, as shown in FIG. 3(*b*), a step 5*d* such as a thinned part may be formed at the outer diametrical side or the inner diametrical side of one axial end surface (5*a*') of the cage 5. In such a case, a half of the difference between the inner diameter r and the outer diameter R may be various values. Of these values, the maximum value is defined as the thickness d in the radial direction. For example, in the example shown in FIG. 3(*b*), the size at a side of the axial end surface 5*a* is the thickness d in the radial direction. In this manner, each of the inner diameter and the outer diameter is measured at a portion of the axial end surface in which the inner diameter or the outer diameter varies in accordance with the shape of the cage, so as to specify the thickness d in the radial direction.

Figure 4:
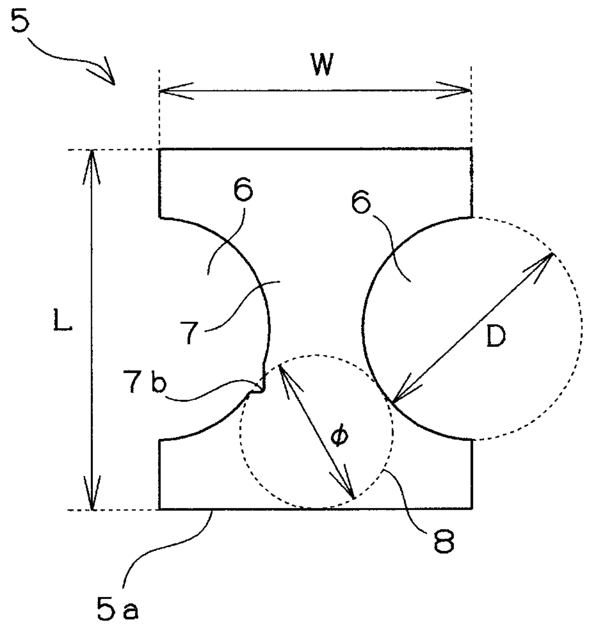
FIG. 4 is a plane developed view of an outer diametrical surface of the cage.

Next, FIG. 4 shows a plane developed view of the outer diametrical surface of the cage. FIG. 4 shows one unit in a repeating structure of the outer diametrical surface. Each of the halves of the pockets 6, 6 is disposed at both sides of the column portion 7 in the cage 5.

In the injection molding for molding the cage, the cooling and solidifying rate of the molten resin is different between in a portion adjacent to a surface of a cavity that is in contact with the molding die and in a portion away from the surface. In the cage, in particular, the portion near the proximal end of the column portion is furthest away from the surface of the cavity, and thus the internal defect is easily caused therein. In the present invention, the internal defect can be favorably suppressed in such a portion by employing the above-described polyamide resin.

Specifically, even in a case in which a diameter ϕ of an inscribed circle 8 of a region surrounded by the pockets 6, 6 adjacent to each other and the axial end surface 5*a* is 3.00 mm or more in the cage, the generation of the internal defect is favorably suppressed in the above-described portion. The diameter ϕ of the inscribed circle 8 may be 5.00 or more, while the diameter ϕ of the inscribed circle 8 may be, for example, 15.00 mm or less, or 10.00 mm or less. The inscribed circle 8 is defined as the shape of the pocket 6 in the plane developed view is a circle without considering the shape of a thinned part 7*b* formed around the pocket 6. Further, in a case in which the pockets 6 are disposed at the same intervals and the center of the pocket conforms to the center in the width (axial length) L of the cage 5, the diameter ϕ of the inscribed circle 8 is calculated by the following formula (1).

Math 1

$$\phi = (W^2 + L^2 - D^2)/(2\times(L+D)) \quad (1)$$

In the formula (1), W denotes a unit width (outer peripheral length/the number of pockets) in the cage, L denotes the width of the cage, and D denotes a pocket diameter.

In the rolling bearing cage of the present invention, the width L of the cage is, for example, 5.00-40.00 mm, preferably 10.00-35.00 mm. Further, the radio (L/d) of the width L to the thickness dis preferably 3.00-6.00 because the ratio within this range can further easily suppress the generation of a void.

The pocket diameter D or the unit width W (outer peripheral length/the number of pockets) of the cage is not especially limited and is appropriately set. For example, the pocket diameter Dis 5.00-40.00 mm, preferably 10.00-35.00 mm. For example, the unit width W is 10.00-40.00 mm, preferably 10.00-30.00 mm.

In the example shown in FIGS. 1 and 2, the angular ball bearing is described as an example of the rolling bearing of the present invention, however the type of the bearing to which the present invention is applied is not limited thereto. Thus, the present invention may be applied to other ball bearing, a tapered roller bearing, a cylindrical roller bearing, a self-aligning roller bearing, or a needle roller bearing.

Figure 5:
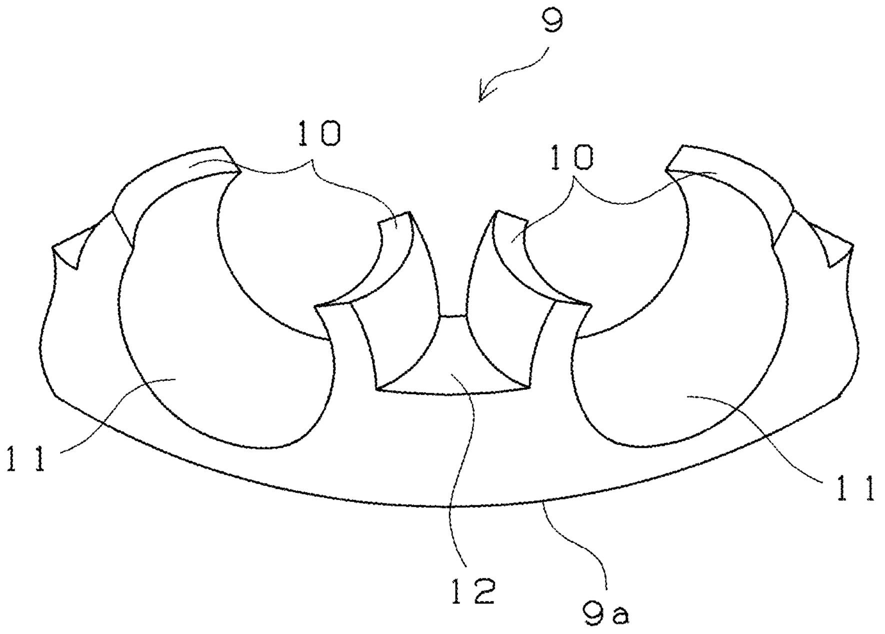
FIG. 5 is a partial, enlarged perspective view showing another example of the rolling bearing cage according to the present invention.

A crown type cage as another example of the rolling bearing cage of the present invention is described with reference to FIG. 5. FIG. 5 is a partial, enlarged perspective view of a crown type cage obtained by injection-molding the above-described resin composition. As shown in FIG. 5, a cage 9 has pairs of facing retaining claws 10 disposed on an upper surface of an annular cage body at a certain pitch in the circumferential direction. The facing retaining claws 10 are curved to be close to each other, so that a pocket 11 for retaining a ball as a rolling element is formed between the retaining claws 10. A flat portion 12, which is a rising base surface of the retaining claw 10, is formed between the back sides of the retaining claws 10 adjacent to each other between the adjacent pockets 11.

In the crown type cage, the thickness in the radial direction of an axial end surface 9*a* opposite to the retaining claw 10 is 2.00 mm or more. The thickness in the radial direction is obtained similar to the description based on FIGS. 3(*a*) and 3(*b*). Further, the inscribed circle is similarly defined. Further, this shall be applied to other cage.

The rolling bearing cage of the present invention employs the polyamide resin formed by copolymerizing a specified aromatic polyamide resin and aliphatic polyamide resin so that the generation of the internal defect can be suppressed even in an aromatic polyamide resin cage having a relatively thick wall in which the internal defect is easily caused. Further, the rolling bearing cage of the present invention can decrease the internal defect compared to a general cage formed of aliphatic polyamide resin that is widely employed.

Generally, in order to suppress the internal defect or the deformation caused by the contraction behavior, a molding die structure that can decrease the temperature difference between the inside and the outside by disposing a thinned part in a thick wall portion may be employed. However, the thinned part is difficult to be disposed or the thickness of the thinned part becomes large depending on the shape of the cage. The present invention is effective because the present invention need not take such a measure to cope with the internal defect and the deformation.

EXAMPLE

The present invention is further described with reference to Example, however the present invention is not limited to Example.

Cages having various sizes were produced using various resin materials, and then the presence/absence of the internal defect (crack or void) thereof was checked. The resin compositions employed in Example and Comparative examples are as below. The resin composition contains 100 wt % of polyamide resin.

Example A: PA6T/66
Comparative example A: PA10T
Comparative example B: PA66
Comparative example C: PA9T
Comparative example D: PA6T/6I First, the cages No. 1 to No. 10 shown in Table 1 were produced by the injection molding using PA6T/66 (Example A) and PA10T (Comparative example A). The cage was shaped as a machined cage as shown in FIG. 2. The thickness d in the radial direction and the diameter ϕ of the inscribed circle of each produced cage were measured. The thickness d in the radial direction is calculated as a half of a difference between the inner diameter and the outer diameter of the axial end surface. The diameter ϕ of the inscribed circle is calculated by the above-described formula (1). The ratios (L/d) of the width L to the thickness d are 3.00-6.00 in the cages No. 1 to No. 8 and less than 3.00 in the cages No. 9 and No. 10. The result is shown in Table 1.

Figure 6:
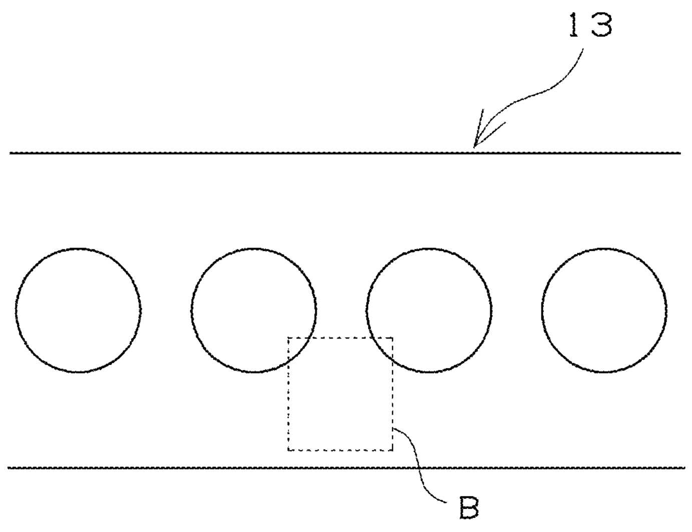
FIG. 6 is a view showing a measuring part for an evaluation of an internal defect in Example.
Figure 7:
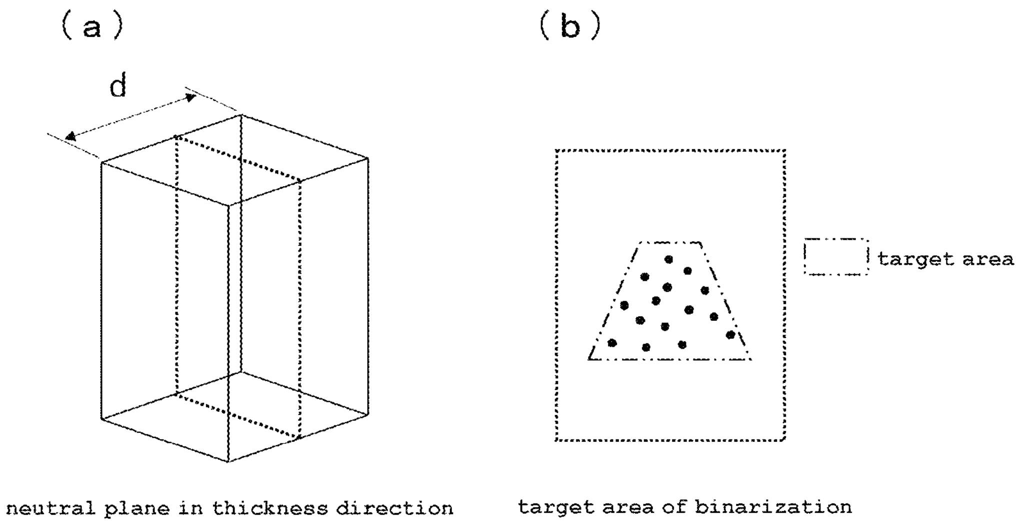
FIGS. 7(*a*) and 7(*b*) are views showing a neutral plane and a target area of binarization for the evaluation of the internal defect.
Figure 8:
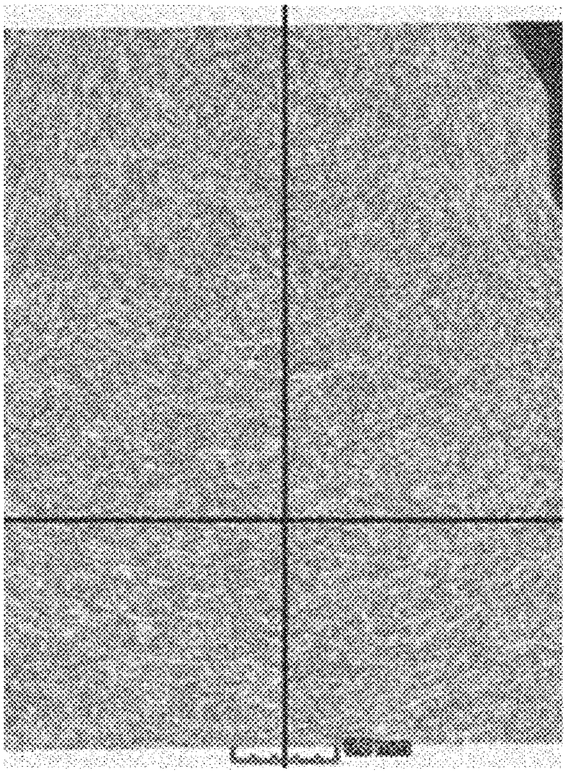
FIG. 8 is an observation image of a cage of Example A.
Figure 9:
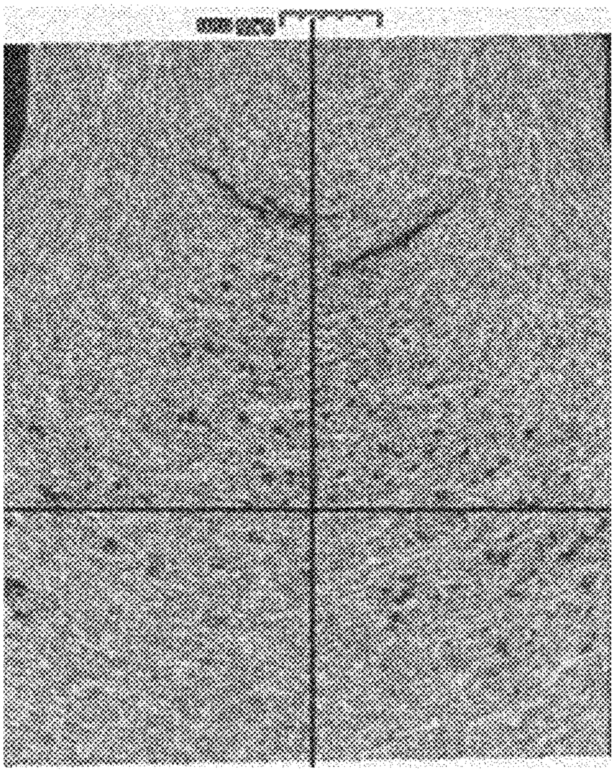
FIG. 9 is an observation image of a cage of Comparative example A.

The internal defect in each cage was evaluated based on a CT tomographic image of a neutral plane of a thick portion where the defect is mostly caused. FIG. 6 shows a measured portion (region B) of the internal defect of the cage 13. FIGS. 8 and 9 show the CT tomographic images of the cage No. 7 of Example A and the cage No. 7 of Comparative example C. The crack was evaluated as its presence/absence based on the CT tomographic image (3: absence of crack, 2: presence of crack). The void was evaluated by a defect area rate calculated based on the CT tomographic image (3: no defect, 2: defect area rate of less than 10%, 1: defect area rate of 10% or more). The defect area rate was calculated by binarizing a region in which the void is caused as shown in FIG. 7(*b*) in the CT tomographic image of the neutral plane (see FIG. 7(*a*)) in the thickness d, where the void or the crack is easily caused in an observation area shown in FIG. 6. The result is shown in Table 1.

TABLE 1

| Cage No. | Thickness d in radial direction (mm) | Diameter ϕ of inscribed circle (mm) | Example A PA6T/66 Crack | Example A PA6T/66 Void | Comparative example A PA10T Crack | Comparative example A PA10T Void |
|---|---|---|---|---|---|---|
| No. 1 | 2.15 | 3.80 | 3 | 3 | 3 | 2 |
| No. 2 | 2.90 | 4.33 | 3 | 3 | 3 | 2 |
| No. 3 | 2.90 | 5.05 | 3 | 3 | 2 | 2 |
| No. 4 | 3.47 | 5.97 | 3 | 3 | 2 | 2 |
| No. 5 | 4.40 | 6.39 | 3 | 3 | 2 | 2 |
| No. 6 | 5.10 | 6.81 | 3 | 3 | 2 | 2 |
| No. 7 | 4.20 | 8.85 | 3 | 3 | 2 | 1 |
| No. 8 | 5.05 | 8.03 | 3 | 3 | 2 | 1 |
| No. 9 | 11.45 | 13.09 | 3 | 2 | 2 | 1 |
| No. 10 | 13.60 | 13.83 | 3 | 2 | 2 | 1 |

As shown in Table 1, in Example A that employs the PA6T/66, the crack is not caused while the void is slightly caused only in the cage having extremely thick thickness d of 10.00 mm or more. Thus, Example A shows superior result. According to FIG. 8, in the cage No. 7, the crack and the void are not shown.

Against this, in Comparative example A that employs the PA10T, superior result is shown in the cage having thin thickness d, however in the cage having the thickness d in the radial direction of 3.00 mm or more, the internal defect such as the crack and the void is apt to be easily caused. Further, even in a case in which the cages have the substantially same thickness d in the radial direction, the generation of the void is different. In the cage having a complex shape, it is appropriate that the wall thickness is represented by the diameter ϕ of the inscribed circle, and it is found that the diameter ϕ of the inscribed circle in the plane developed view of the outer diametrical surface of the cage affects the amount or the number of the voids.

Figure 10:
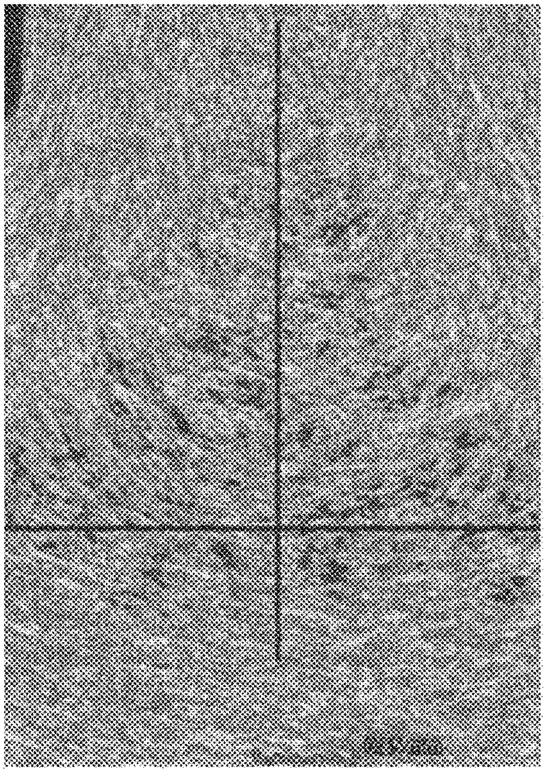
FIG. 10 is an observation image of a cage of Comparative example B.

Next, the cages No. 4, No. 7 and No. 10 were produced by the injection molding using PA66 (Comparative example B), PA9T (Comparative example C) and PA6T/6I (Comparative example D). The cage was shaped as a machined cage as shown in FIG. 2. The internal defects of these cages were also evaluated as described above. FIG. 10 shows a CT tomographic image of the cage No. 7 of Comparative example B. The result is shown in Table 2.

High Speed Durability Test

The high speed durability test was executed using the cage No. 4 of Example A and the cages No. 4 of Comparative examples A to D. The durability test was executed for 100 hours at each of the dm·n value of $80\times10^4$, the dm·n value of $160\times10^4$, the dm·n value of $240\times10^4$, and the dm·n value of $280\times10^4$, using the angular ball bearing. A comparative test was executed using the angular ball bearing in which the cages of Example A and Comparative examples A to D were installed and the grease as a lubricant was sealed at both sides using non-contact seals. After the test, a case in which the cage is not damaged is evaluated as “3”, a case in which vibration is caused or the cage is damaged is evaluated as "2", and a case in which the test is stopped due to the melt of the cage, the maximum temperature limit or excessive output of the motor is evaluated as "1". The result is shown in Table 2.

TABLE 2

| | | | Example A | Comparative example A | Comparative example B | Comparative example C | Comparative example D |
|---|---|---|---|---|---|---|---|
| Resin material | | | PA6T/66 | PA10T | PA66 | PA9T | PA6T/6I |
| Glass transition temperature (° C.) | | | 95 | 120 | 60 | 125 | 130 |
| Melting point (° C.) | | | 310 | 315 | 260 | 305 | 325 |
| Internal defect generation state | No. 4 | Void | 3 | 2 | 1 | 2 | 2 |
| | | Crack | 3 | 2 | 3 | 2 | 2 |
| | No. 7 | Void | 3 | 1 | 1 | 2 | 2 |
| | | Crack | 3 | 2 | 3 | 2 | 2 |
| | No. 10 | Void | 2 | 1 | 1 | 1 | 2 |
| | | Crack | 3 | 2 | 3 | 2 | 2 |
| High speed durability test | dm · n of $80 \times 10^4$ | | 3 | 3 | 3 | 3 | 3 |
| | dm · n of $160 \times 10^4$ | | 3 | 3 | 3 | 3 | 3 |
| | dm · n of $240 \times 10^4$ | | 3 | 3 | 1 | 3 | 3 |
| | dm · n of $280 \times 10^4$ | | 3 | 3 | 1 | 3 | 3 |

As shown in Table 2, the aromatic polyamide resin such as the PA10T and the PA9T (Comparative examples A and C) has high melting point and high glass transition temperature and thus shows superior durability in the high speed durability test. However, since the cage formed of each of these resins causes the internal defect such as crack and void, the break of the cage might be caused or the fatigue property might be deteriorated when the delay/progress stress increases due to the change of the driving state (lubrication state). In the PA66 (Comparative example B) that is aliphatic polyamide resin, the void is caused while the crack is not caused. However, since the PA66 has low melting point and low glass transition temperature, the durability thereof is deteriorated in higher speed rotation condition. Further, in the PA6T/6I (Comparative example D) that is other aromatic polyamide resin or PA6T based material, the crack or the like is caused.

Against this, Example A that employs the PA6T/66 decreases the internal defect such as crack and void and shows the melting point and the glass transition temperature higher than those of the PA66, so that sufficient durability is shown in the high speed rotation test condition.

As described above, the resin cage that has both superior moldability of the aliphatic polyamide resin and superior heat resistance of the aromatic polyamide resin can be produced by employing a specified polyamide resin formed by copolymerizing the aromatic polyamide resin and the aliphatic polyamide resin. Thus, even in a cage having a thick wall, the internal defect and the deformation of the cage can be suppressed without disposing the thinned part, which copes with the internal defect and the deformation of the cage without processing a metal die having a complex shape.

INDUSTRIAL APPLICABILITY

The rolling bearing cage of the present invention has superior heat resistance and realizes superior moldability even in a cage having a thick wall, in particular the generation of the internal defect such as crack and void can be suppressed. Thus, the rolling bearing cage of the present invention is suitable to be used in a high temperature atmosphere (for example, high temperature of 80° C. or more) or in a high speed rotation condition (for example, dm·n value of $80 \times 10^4$ or more) and is suitably applied to various rolling bearing cages employed in automobiles, motors and machine tools.

REFERENCE SIGNS LIST

1: angular ball bearing (rolling bearing)
2: inner ring
3: outer ring
4: ball
5: cage
6: pocket
7: column portion
8: inscribed circle
9: cage
10: retaining claw
11: pocket
12: flat portion
13: cage

The invention claimed is:

1. An annular rolling bearing cage formed by injection-molding a resin composition, the rolling bearing cage comprising rolling elements and a plurality of pockets for retaining the rolling elements,
wherein:
a thickness in a radial direction of an axial end surface of the cage is 3.00 mm or more;
in a plane view of an outer diametrical surface of the cage, a diameter of an inscribed circle of a region surrounded by the pockets adjacent to each other and the axial end surface is 5.00 mm or more;
the resin composition contains polyamide resin as a base resin; and
the polyamide resin is copolymerized polyamide containing a hexamethylene terephthalamide unit and a hexamethylene adipamide unit as a constitutional unit.

2. The rolling bearing cage as defined in claim 1, wherein the polyamide resin has a glass transition temperature of 80-110° C. and a melting point of 300° C. or more.

3. The rolling bearing cage as defined in claim 1, wherein the resin composition contains 10-50 wt % of glass fiber or carbon fiber relative to a whole of the resin composition.

4. The rolling bearing cage as defined in claim 1, wherein:
in a plane view of an outer diametrical surface of the cage, a diameter of an inscribed circle of a region surrounded by the pockets adjacent to each other and the axial end surface is 5.00-10.00 mm, a ratio (axial length/thickness in radial direction) of the axial length of the cage to the thickness in the radial direction of the axial end surface of the cage is 3.00-6.00, and the polyamide resin has a glass transition temperature of 80-110° C. and a melting point of 300° C. or more.

5. A rolling bearing comprising:

an inner ring;

an outer ring;

a plurality of rolling elements intervened between the inner ring and the outer ring; and a cage which retains the rolling elements, wherein the cage is the rolling bearing cage as defined in claim 1.

* * * * *